(12) United States Patent
Morris et al.

(10) Patent No.: US 11,316,211 B2
(45) Date of Patent: Apr. 26, 2022

(54) INTRINSICALLY SAFE BATTERY

(71) Applicant: SCOTT TECHNOLOGIES, INC., Monroe, NC (US)

(72) Inventors: John H. Morris, Dacula, GA (US); David J. Yackman, Winder, GA (US)

(73) Assignee: Scott Technologies, Inc., Monroe, NC (US)

( * ) Notice: Subject to any disclaimer, the term of this patent is extended or adjusted under 35 U.S.C. 154(b) by 266 days.

(21) Appl. No.: 16/487,061

(22) PCT Filed: Apr. 11, 2018

(86) PCT No.: PCT/US2018/027127
§ 371 (c)(1),
(2) Date: Aug. 19, 2019

(87) PCT Pub. No.: WO2018/191390
PCT Pub. Date: Oct. 18, 2018

(65) Prior Publication Data
US 2020/0058963 A1 Feb. 20, 2020

Related U.S. Application Data

(60) Provisional application No. 62/485,070, filed on Apr. 13, 2017.

(51) Int. Cl.
*H01M 10/42* (2006.01)
*H01M 10/46* (2006.01)
(Continued)

(52) U.S. Cl.
CPC ....... *H01M 10/4257* (2013.01); *H01M 10/46* (2013.01); *H02J 7/00* (2013.01);
(Continued)

(58) Field of Classification Search
CPC ............. H01M 10/4257; H01M 10/46; H01M 2010/4271; H01M 2010/4278; H02J 50/10; H02J 7/0009
(Continued)

(56) References Cited

U.S. PATENT DOCUMENTS 9,385,789 B1 * 7/2016 Van Bosch et al. . H04B 5/0081
9,490,876 B2 * 11/2016 Choi ................. H04M 1/72454
(Continued)

FOREIGN PATENT DOCUMENTS

KR 10-2014-0117081 10/2014
KR 10-2015-0002044 1/2015

OTHER PUBLICATIONS

International Search report for PCT International Application No. PCT/US2018/027127 dated Aug. 6, 2018, 3 pages.

*Primary Examiner* — Sun J Lin

(57) ABSTRACT

A battery pack configured to be housed in an electronic device, the electronic device including a near field communication (NFC) tag, the battery back including a battery housing. The battery housing includes a rechargeable battery cell configured to provide power to the electronic device, the rechargeable battery cell initially in a first power mode, an NFC antenna configured to detect a presence of the NFC tag within the electronic device, and processing circuitry including a memory and a processor, the memory in communication with the processor, the memory having instructions that, when executed by the processor, configure the processor to convert the rechargeable battery cell from the first power mode to a second power mode when the NFC antenna has detected the presence of the NFC tag within the electronic device.

18 Claims, 3 Drawing Sheets

(51) Int. Cl.
   *H02J 7/00* (2006.01)
   *H02J 50/10* (2016.01)
   H02J 50/80 (2016.01)
   H02J 50/90 (2016.01)
   H02J 50/00 (2016.01)
(52) U.S. Cl.
   CPC ...... *H02J 7/00034* (2020.01); *H02J 7/00043*
      (2020.01); *H02J 50/10* (2016.02); *H01M*
      *2010/4271* (2013.01); *H01M 2010/4278*
      (2013.01); *H02J 7/00032* (2020.01); *H02J*
      *7/00038* (2020.01); *H02J 7/0047* (2013.01);
      *H02J 50/005* (2020.01); *H02J 50/80*
      (2016.02); *H02J 50/90* (2016.02)
(58) Field of Classification Search
   USPC ........................................... 320/137
   See application file for complete search history.

(56) References Cited

U.S. PATENT DOCUMENTS

| | | | |
|---|---|---|---|
| 9,704,003 B1* | 7/2017 | Anderson et al. | G06K 7/10297 |
| 9,865,106 B2* | 1/2018 | Maor | H04W 4/80 |
| 10,211,514 B2* | 2/2019 | Jung et al. | H01Q 1/243 |
| 10,342,219 B2* | 7/2019 | Deliou et al. | A01K 11/004 |
| 10,582,359 B2* | 3/2020 | Arneson et al. | H04L 12/4604 |
| 10,606,406 B2* | 3/2020 | Park | G06F 3/0488 |
| 10,892,800 B1* | 1/2021 | Katz | H04B 5/0037 |
| 2003/0189417 A1 | 10/2003 | Dias | |
| 2010/0153039 A1 | 6/2010 | Raichle | |
| 2012/0182132 A1 | 7/2012 | McShane | |
| 2019/0123575 A1 | 4/2019 | Cha | |

* cited by examiner

INTRINSICALLY SAFE BATTERY

CROSS REFERENCE TO RELATED APPLICATIONS

This application is a national stage filing under 35 U.S.C. 371 of PCT/US2018/027127, filed Apr. 11, 2018, which claims the benefit of U.S. Provisional Patent Application No. 62/485,070, filed Apr. 13, 2017, the disclosures of which are incorporated by reference in their entirety herein.

TECHNICAL FIELD

This disclosure relates to a battery and specifically to an intrinsically safe battery pack for use in hazardous environments.

BACKGROUND

The use of electronic devices such as thermal imaging cameras, gas detectors, and electronics used in self-contained-breathing apparatuses (SCBAs) can be dangerous when these devices are used in hazardous environments. For example, the use of a gas detector in an environment where a gas leak may be present might be problematic because the gas detector has electronic components and there is always the danger of the electronic component emitting a spark which, in a gaseous environment, can cause a fire or explosion.

Many electronic components used in hazardous environments include a locked compartment to house batteries in order to prevent the batteries from being inadvertently dislodged or rotated. However, the use of locked battery compartments can prove to be cumbersome, expensive, and not entirely preventative of unwanted sparking or igniting of the electronic components of the device. Further, the mechanical lock itself may malfunction or wear down thereby leading to an ineffective mechanism in which to prevent unwanted sparking or igniting of the electrical components.

SUMMARY

Some embodiments advantageously provide an intrinsically save battery pack, system, and method for use in hazardous environments where the electrical contacts of the battery pack are not powered on until the battery pack is inserted in an electronic device.

In one aspect of the disclosure, a battery pack configured to be housed in an electronic device is provided, where the electronic device including a near field communication (NFC) tag. The battery back includes a battery housing, the housing including a rechargeable battery cell configured to provide power to the electronic device, the battery cell initially in a first power mode, an NFC antenna configured to detect a presence of the NFC tag within the electronic device, and processing circuitry including a memory and a processor, the memory in communication with the processor, the memory having instructions that, when executed by the processor, configure the processor to convert the battery cell from the first power mode to a second power mode when the NFC antenna has detected the presence of the NFC tag within the electronic device.

According to an embodiment of this aspect, the first power mode is when the battery cell is in a low power mode and the second power mode is when the battery cell is in a high power mode. According to another embodiment, the first power mode is when the battery cell is deactivated and the second power mode is when the battery cell is at least partially powered. According to another embodiment, the battery pack further includes a wireless charging coil for receiving wireless charging signals from a battery cell charging source.

According to another embodiment, the NFC antenna is configured to receive wireless charging signals from a battery cell charging source. According to another embodiment, the NFC antenna is positioned within the housing within a predetermined distance from the NFC tag when the battery pack is inserted within the electronic device, the battery cell changing from the first power mode to the second power mode when the NFC antenna is positioned within the predetermined distance from the NFC tag, and the battery cell changing from the second power mode to the first power mode when the NFC antenna is not positioned within the predetermined distance from the NFC tag.

According to another embodiment, the battery housing further includes a storage element, the storage element configured to store at least one access code, the NFC antenna further configured to receive information from the NFC tag, the information including at least one access code, and the processor further configured to compare the received at least one access code with the stored at least one access code. If the received at least one access code matches the stored at least one access code, the processor is further configured to provide instructions to the battery cell. According to another embodiment the instructions include an instruction to provide a more level charge to the battery cell. According to another embodiment, the instructions include an instruction to provide a number of charge cycles for the battery cell. According to another embodiment, the instructions include an instruction to provide power to the battery cell. According to another embodiment, the processor is further configured to at least one of monitor a condition of the battery cell, provide fuel-gauging data, implement a stress test on the battery cell, and provide battery cell cycle count data.

According to another aspect of the disclosure, a battery pack is provided, where the battery pack is configured to be housed in an electronic device, the electronic device including a near field communication (NFC) tag. The battery back includes a battery housing, the housing including a rechargeable battery cell configured to provide power to the electronic device, the battery cell initially in a deactivated mode, a wireless charging coil for receiving wireless charging signals from a battery charging source, an NFC antenna situated within the housing within a predetermined distance from the NFC tag when the battery pack is inserted within the electronic device, the NFC configured to detect a presence of the NFC tag within the electronic device and to receive information from the NFC tag, the information including at least one access code, a storage element, the storage element configured to store at least one access code, and processing circuitry including a memory and a processor, the memory in communication with the processor. The memory has instructions that, when executed by the processor, configure the processor to convert the battery cell from the deactivated mode to a powered configuration when the NFC antenna is within the predetermined distance from the NFC tag, compare the received at least one access code with the stored at least one access code, and if the received at least one access code matches the stored at least one access code, provide instructions to the rechargeable battery cell.

According to another aspect of the disclosure, a system for providing an intrinsically safe battery is provided. The system includes an electronic device, the electronic device comprising a near field communication (NFC) tag, and a battery pack configured to be housed in the electronic device. The battery back includes a battery housing, the housing including a rechargeable battery cell configured to provide power to the electronic device, the battery cell initially in a first power mode, an NFC antenna configured to detect a presence of the NFC tag within the electronic device, and processing circuitry including a memory and a processor, the memory in communication with the processor, the memory having instructions that, when executed by the processor, configure the processor to convert the battery cell from the first power mode to a second power mode when the NFC antenna has detected the presence of the NFC tag within the electronic device.

According to another aspect of the disclosure, a method for safely powering up an electronic device is provided where the electronic device includes a near field communication (NFC) tag. The method includes providing a battery housing, the battery housing including a rechargeable battery cell configured to provide power to the electronic device, the battery cell initially in a non-power mode, detecting, by an NFC antenna in the battery housing, a presence of the NFC tag within a predetermined distance of the NFC antenna, and powering the battery cell when the NFC antenna has detected the presence of the NFC tag within predetermined distance of the NFC antenna.

According to an embodiment of this aspect, the method further includes receiving wireless charging signals from a battery charging source. According to another embodiment, the method further includes positioning the NFC antenna within a predetermined distance from the NFC tag when the battery pack is inserted within the electronic device, the battery cell changing from the non-power mode to the power mode when the NFC antenna is positioned within the predetermined distance from the NFC tag.

According to another embodiment, the method further includes storing at least one access code, receiving information from the NFC tag, the information including at least one access code, comparing the received at least one access code with the stored at least one access code; and if the received at least one access code matches the stored at least one access code, providing instructions to the battery cell. According to another embodiment, the instructions include an instruction to provide a more level charge to the battery cell. According to another embodiment, the instructions include an instruction to provide a number of charge cycles for the battery cell. According to another embodiment, the instructions include an instruction to provide power to the battery cell. According to another embodiment, the method further includes powering down the battery cell by removing the battery housing from the electronic device.

According to another aspect of the disclosure, a battery pack configured to be housed in an electronic device, the electronic device including a radio frequency identification (RFID) tag, is provided. The battery back includes a battery housing, the housing including a rechargeable battery cell configured to provide power to the electronic device, the battery cell initially in a first power mode, an RFID antenna configured to detect a presence of the RFID tag within the electronic device, and processing circuitry including a memory and a processor, the memory in communication with the processor, the memory having instructions that, when executed by the processor, configure the processor to convert the battery cell from the first power mode to a second power mode when the RFID antenna has detected the presence of the RFID tag within the electronic device.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
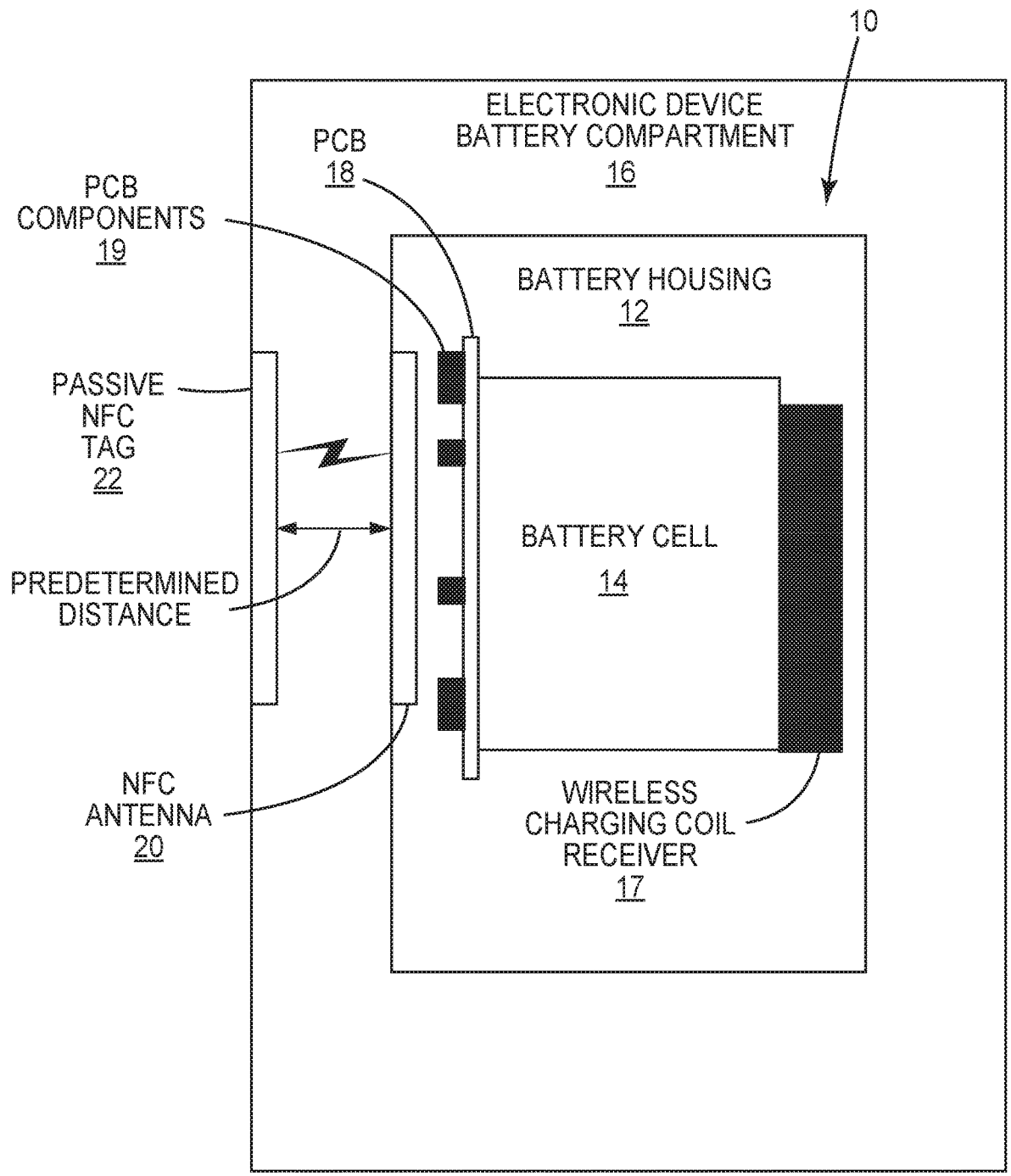
FIG. 1 is a diagram of the battery pack of the present disclosure after insertion into a battery compartment of an electronic device.

Before describing in detail exemplary embodiments, it is noted that the embodiments reside primarily in combinations of apparatus components and processing steps related to providing an intrinsically safe battery pack for use in electronic devices in hazardous environments in which the electrical output contacts of the battery pack are not powered on until the battery pack is inserted in an electronic device. The battery pack of the present disclosure is configured to be housed in an electronic device, the electronic device including a radio frequency identification (RFID) tag such as, for example, a near field communication (NFC) tag. The battery pack includes a battery housing having a rechargeable battery cell configured to provide power to the electronic device. The battery cell is initially in a first power mode, for example, in a deactivated mode. The battery housing includes an RFID antenna, such as, for example, an NFC antenna, configured to detect the presence of the RFID or NFC tag within the electronic device. Included in the battery housing is processing circuitry including a memory and a processor, where the memory has instructions that, when executed by the processor, configure the processor to convert the battery cell from the first power mode, i.e., a deactivated mode, to a second power mode, i.e., a powered mode, when the RFID or NFC antenna has detected the presence of the RFID or NFC tag within the electronic device. In this fashion, the battery back remains deactivated until the NFC antenna detects the presence of the NFC tag in the electronic device, which occurs when the RFID or NFC antenna is within a predetermined distance of the RFID or NFC tag, i.e., when the battery pack has been installed within the electronic device. Accordingly, the apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designations refer to like elements, an example of a battery back constructed in accordance with principles of the present invention is shown in FIG. 1 and generally designated as "10." Battery pack 10 includes a battery housing 12, which includes one or more battery cells 14. In FIG. 1, although only one battery cell 14 is showing within battery housing 12, it is within the scope of the present disclosure to include a battery housing 12 that is sized to accommodate more than one battery cell 14. Battery cell 14 may be, for example, a rechargeable cell such as a nickel-cadmium cell, or a lithium ion cell. The present disclosure is not limited to a particular type of battery cell. Battery cell 14 may be charged via a wired or wireless connection to a battery charger, either located within an electronic device or remotely. In one embodiment, battery housing 14 includes wireless charging coil receiver 17 that receives wireless charging signals. In such an embodiment, battery cell 14 may be charged inductively or resonantly charged. Wireless charging of battery cell 14 via a remote charger can advantageously allow battery cell 14 to be safely charged in hazardous environments. In one embodiment, the contacts of battery cell 14 include redundant isolation protection. Battery housing 12 may include a door (not shown) to allow for the insertion of battery cell 14 within battery housing 12. Battery housing 12 is configured to be inserted within a battery compartment 16 of an electronic device. The electronic device may be any electronic device designed to be operated by one or more batteries and further designed to operate in hazardous environments. For example, the electronic device could be a camera, such as a thermal imaging camera, a motion sensor, a gas detector, or a self-contained breathing apparatus (SCBA), which includes electrical components. Battery back 10 may be inserted within any electronic device and the present disclosure is not limited in this regard.

Battery housing 12 includes a printed circuit board (PCB) 18 or other element configured to include the computing and other electronic components used to perform the functions described herein. PCB 18 includes electrical components 19 for monitoring the condition of battery cell 14, and also provides fuel-gauging data, can engage in battery stress testing, provide cycle count data, as well as other battery cell-monitoring functions. In other words, PCB 18 refers generally to the physical circuit board plus the electrical components 19 and not to just the physical circuit board. Battery pack 10 also includes electrical power output contacts 21 (shown in FIG. 2) that are in electrical communication with, or part of, PCB 18 and/or are in electrical communication with batter cell 14. The electrical power output contacts 21 are arranged to electrically engage with corresponding electrical power input contacts of electronic device 24.

Battery housing 12 also includes an NFC transceiver antenna 20. NFC transceiver antenna 20 is configured to communicate with NFC devices, such as a passive NFC tag 22 (discussed below) via near field communication protocols known in the art, over short distances, for example, a few centimeters. A typical NFC transceiver antenna 20 operates at a frequency of 13.56 MHz. NFC transceiver antenna 20 is configured to detect the presence of NFC tag 22 when within a predetermined distance from NFC tag 22. The "predetermined distance" as discussed herein and depicted in the figures can be any distance suitable to allow NFC antenna 20 to communicate with NFC tag 22. NFC transceiver antenna 20 can be calibrated such that it only detects NFC tags 22 that are a very short distance away, i.e., a few centimeters.

In this fashion, and as further discussed below, NFC transceiver antenna 20 can only detect the presence of NFC tag 22 when battery pack 10 has been installed within the electronic device, which positions the NFC transceiver antenna 20 in close proximity to NFC tag 22. At this point, since NFC transceiver antenna 20 is within the predetermined distance from NFC tag 20, NFC transceiver antenna 20 can instruct PCB components 19 on PCB to activate battery cell 14. In this fashion, battery cell 14 cannot be activated until battery pack 10 has been inserted in the battery compartment 16 of the electronic device.

It should be noted that the present disclosure is not limited to communication between NFC tags 22 and NFC transceiver antennas 20. The present disclosure may be also applied to communication between RFID tags and RFID transceiver antennas, which communicate with each other via RFID technology. Thus, for example, NFC tag 22 may also be an RFID tag and NFC transceiver antenna 20. Thus, while the discussion below involves the communication between NFC tag 22 and NFC transceiver antenna 20 via NFC communication protocol, the present disclosure is not limited in this regard and may be expanded to apply the principles of the present disclosure to RFID communication protocol, i.e., communication between an RFID tag in electronic device 24 and an RFID transceiver antenna in battery housing 12.

Figure 3:
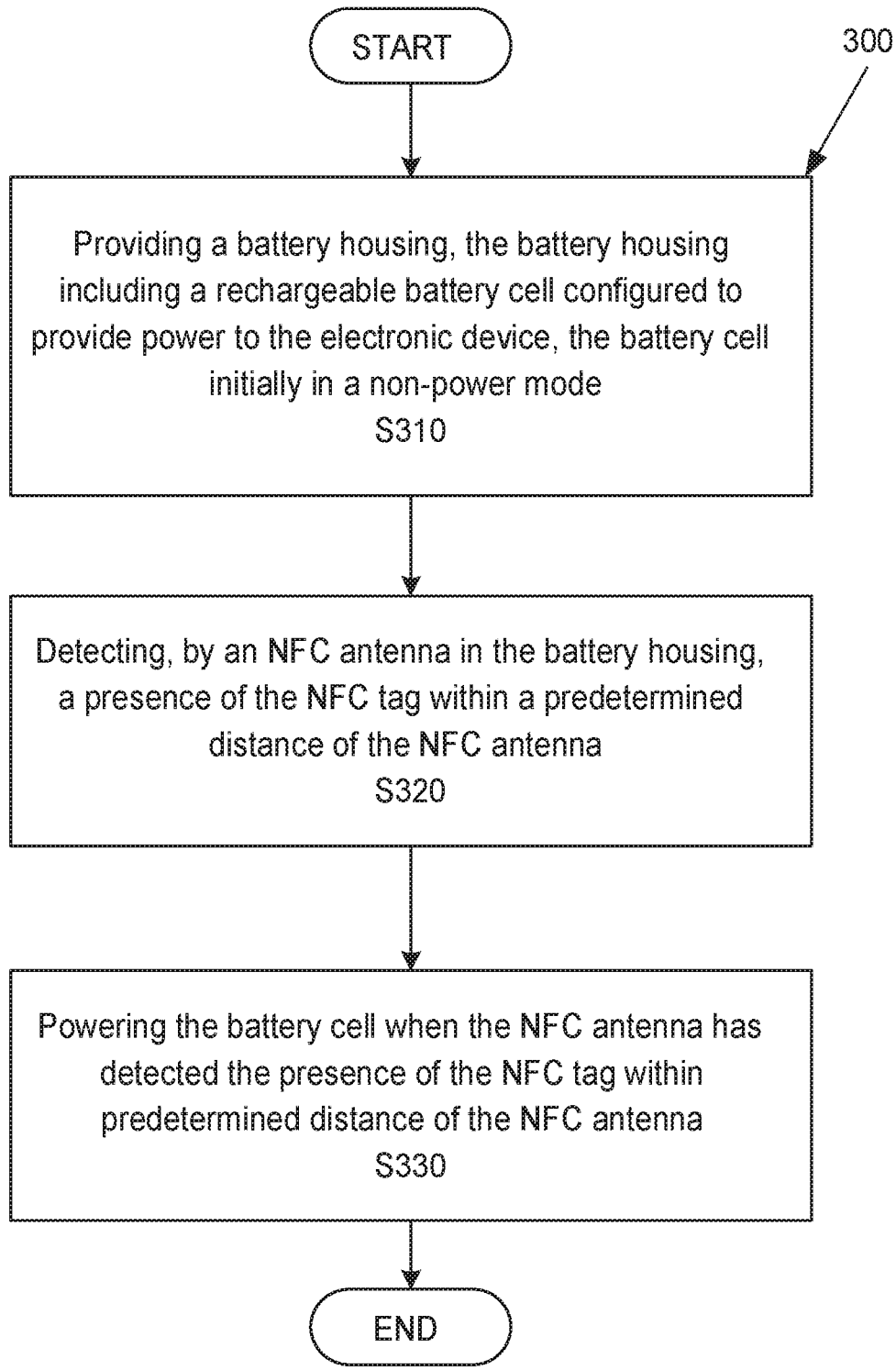
FIG. 3 is a flow diagram illustrating an exemplary method of the present disclosure.

NFC transceiver antenna 20 is also configured to read data from NFC tag 22. PCB components 19 may also include a memory and processor (as shown in FIG. 3) configured to activate battery cell 14 when NFC transceiver antenna 20 is within a predetermined distance of NFC tag 22 and thus able to read data from NFC tag 20. In one embodiment, when battery housing 12 is inserted within battery compartment 16, NFC transceiver antenna 20 is positioned close to NFC tag 22, i.e., within the predetermined distance, such that NFC transceiver antenna 20 receives information from NFC tag 22. This information might be to activate battery cell 14, which had previously been in a deactivated mode. In another embodiment, and as further discussed below, the information obtained from NFC tag 22 might include identifiers, i.e., a data string, that identify the electronic device and/or the type of electronic device. This information might be used by PCB components 19, specifically the processor, to provide activation instructions to battery cell 14 to power up the battery cell 14, to power down the battery cell 14, or to change the power mode of the battery cell 14, i.e., from a low power mode to a high power mode, or vice versa. In this fashion, battery cell 14 only becomes activated when powering the electronic device, i.e., when battery pack 10 is inserted within battery compartment 16, and NFC transceiver antenna 20 is situated within the predetermined distance from NFC tag 22, thus enabling NFC transceiver antenna 20 to detect and read data from the NFC tag 22. Of note, the terms activated and deactivated as used herein refer to whether battery cell 14 is powering or not powering electronic device 24, and not to the actual state of charge of battery cell 14. In other words, battery cell 14 can be charged but still be deactivated, i.e., deactivated, such that battery cell 14 is not supplying power to the electrical power output contacts 21 of battery pack 10 and is therefore not supplying power to electronic device 24.

In one embodiment, as mentioned above, battery cell 14 is in a deactivated state when the NFC transceiver antenna 20 is not within the predetermined distance from NFCV tag 22, i.e., when battery pack 10 is not installed in the electronic device, and battery cell 14 is only powered up and supplies power to the electrical power output contacts 21 of the battery pack 10 when NFC transceiver 20 detects the presence of NFC tag 22, i.e., when NFC transceiver 20 is within the predetermined distance from NFC tag 22, i.e., after insertion of the battery pack 10 in the electronic device. For example, when battery housing 12, which contains battery cell 14, is not inserted within battery compartment 16, the NFC transceiver antenna 20, which is within the battery housing 12, cannot detect and read data from NFC tag 22 because it is not within the predetermined distance of NFC tag 22. NFC transceiver antenna 20 can be designed to detect and read data from NFC tag 22 only when the battery housing 12 has been properly inserted within the battery compartment 16 of the electronic device, i.e., when the two near field components, NFC transceiver antenna 20 and NFC tag 22, are within a predetermine distance, thereby indicating that the electrical power output contacts 21 on battery pack 10 can only be properly engaged with the corresponding electrical power input contacts on electronic device 24. In this fashion, if the electronic device is to be operated in a hazardous environment and battery pack 10 has not been inserted or is improperly inserted in electronic device 24, the battery cell 14 remains in a deactivated mode thus preventing any unwanted sparking.

In another embodiment, battery cell 14 is in a low powered configuration, rather than in a deactivated mode. The low powered configuration may still provide some limited power to battery cell 14 but not enough to cause unwanted sparking in a hazardous environment. As in the scenario discussed above, once the battery pack 10 is inserted within the battery compartment 16 of the electronic device, and the NFC transceiver antenna 20 is positioned such that it is within the predetermined distance from NFC tag 22. PCB 18, or components thereon, provides signals to battery cell 14, activating battery cell 14 from a first, low power mode, to a second, power mode, where the second power mode is sufficient to operate the electronic device.

Figure 2:
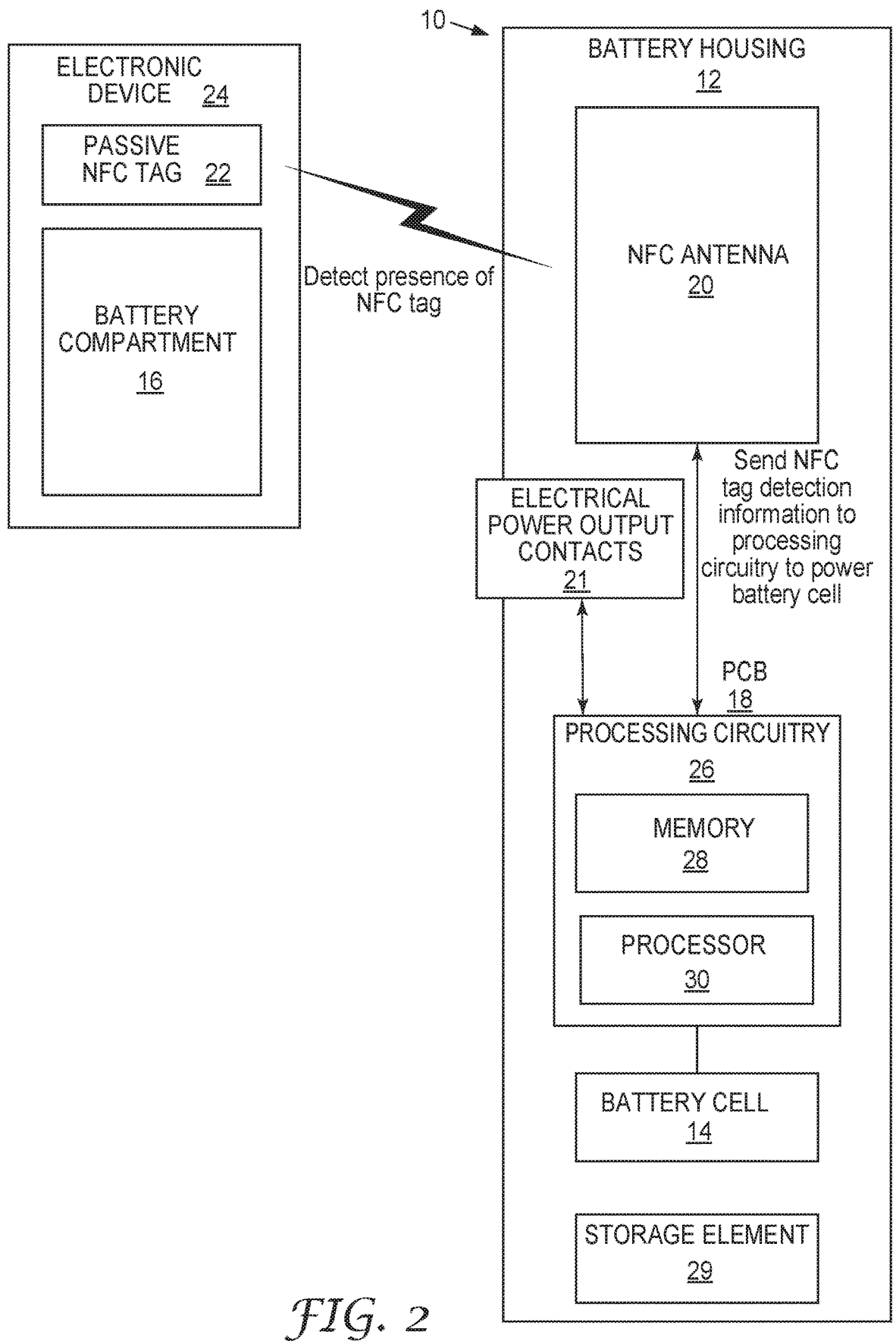
FIG. 2 is a block diagram illustrating certain components of the present disclosure including the communication between the NFC antenna and the passive NFC tag of the electronic device.

FIG. 2 is a block diagram showing components that enable battery pack 10 to function in the manner described herein. In FIG. 2, electronic device 24 could be any type of electrical device (e.g., a camera, or sensor) that is powered by battery cell 14. In particular, electronic device 24 could be a type of device that is used in hazardous environments (e.g., thermal imaging camera, a gas detector, or a SCBA. Electronic device 24 includes a passive NFC tag 22 as described with respect to FIG. 1. NFC tag 22 can store data such as identifiers or codes, which can be transmitted via near field communication to NFC transceiver antenna 20 in order to provide PCB 18 with information. In one embodiment, NFC tag 22 identifies the type of electronic device 24 that NFC tag 22 is housed in, and transmits this identification information to NFC transceiver antenna 20. For example, NFC tag 22 may determine that it is housed in a National Fire Protection Association (NFPA) compatible camera. This information is transmitted to NFC transceiver antenna 20, which can store this information or this information may be stored in a storage element 29 on PCB 18. Thus, NFC tag 22 may store data relating to the type of electronic device 24, the serial number of the electronic device 24, or information about the type or capacity of battery cell 14, and provide this information to NFC transceiver antenna 20.

As shown in FIG. 2, NFC transceiver antenna 20 can detect the presence of NFC tag 22, when within a predetermined distance, i.e., when battery housing 12 is inserted within the battery compartment 16 of electronic device 24, and activate, via components 19 on PCB 18, battery cell 14 or change the power mode of battery cell 14 from one power mode to a second power mode, i.e., a low power mode, to a higher power mode, or vice versa, to allow power to flow to electrical power output contacts 21. When NFC transceiver antenna 20 has detected the presence of NFC tag 22, NFC transceiver antenna 20 can also receive data such as codes and prefixes which are stored on NFC tag 22 and which identify electronic device 24 as well as other parameters, as discussed above. This information is sent to PCB 18, and in particular storage element 29. The stored information can be accessed by processing circuitry 28, which includes a memory 28 and a processor 30. In addition to a traditional processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or read from) memory 28, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by processor 30 and/or other data, e.g., data pertaining to communication, e.g., configuration and/or address data of nodes, etc. Memory 28 has instructions that, when executed by processor 30, configures processor 30 to perform the processes described herein.

The information received from NFC transceiver antenna 20 may be stored in storage element 29 or some other remote storage device. Processor 30, using this information, may then configure instructions to be sent to battery cell 14 in order to power up battery cell 14 or to change the power mode from one power configuration to another, i.e., from a low-power mode to an enhanced power mode, or vice versa. Thus, in one embodiment, processor 30 receives a signal from NFC transceiver antenna 20 indicating that NFC tag 22 has been detected. Processor 30 then activates battery cell 14 (or changes its power mode). In another embodiment, processor 30 can use the information provided to NFC transceiver antenna 20 by NFC tag 22 and power battery cell 14 or change the power configuration of battery cell 14 in accordance with that information. In one embodiment, processor 30 compares the prefixes, codes, identifiers, etc., received by NFC transceiver antenna 20 from NFC tag 22 to prefixes, codes and identifiers stored in storage element 29 or in a remote storage device. Based on this comparison, processor 30 can be configured to perform a variety of tasks. For example, if the identifiers received from NFC tag 22 via NFC transceiver antenna 20 match identifiers stored in storage element 29 (or in a remote storage device in communication with processor 30), processor 30 may determine that electronic device 24 is a thermal imaging camera. Based upon this determination, processor 30 can power up battery cell 14 to full capacity, or to partial capacity immediately, or wait a predetermined amount of time to power up battery cell 14, or slowly ramp up the power to battery cell 14, or provide a level charge to battery cell 14, or provide a series of charge cycles, etc. The decision as to what capacity battery cell 14 should be powered to or the amount of time to wait until processor 30 activates battery cell 14 may be dependent upon the type of electronic device 24 that battery pack 10 is housed in, or other factors. Thus, processor 30 may use the information it receives from NFC transceiver antenna 20, which was obtained from NFC tag 22, compare it to stored information, and make decisions regarding activation of battery cell 14.

In another embodiment, the information received by NFC transceiver antenna 20 (or RFID antenna) may be accessed by a remote device, such as, for example, a mobile device such as a cell phone. An application on the mobile device can be accessed by the user and used to retrieve data obtained by NFC transceiver antenna 20. Thus, in this fashion, a mobile device user, such as a worker at a fire station, hospital, or emergency service station can access data that is received by NFC transceiver antenna 20 from NFC tag 22 by the use of a software application on a mobile device. Further, an application on a mobile device may have the ability to access status about battery cell 14, including, for example, its remaining charge level, battery cell charging history, charge cycle information, how long the battery charge lasts, and other battery cell related information In one embodiment, processor 30 monitors a condition of battery cell 14, provides fuel-gauging data, implements a stress test on battery cell 14, and/or provide battery cell power cycle count data.

In another embodiment, processor 30 constructs a log that includes battery cell history. The log may include charge cycle information, how long the battery charge lasts, and other battery cell related information. This log may be sent to a remote location for additional analysis. As discussed above, this log may be accessed by a software application running on a remote computer such as a mobile cellular device, where the application can allow the user to access, on the mobile cellular device, such data as battery cell history, charge cycle information, how long the battery charge lasts, and other battery cell related information.

FIG. 3 is a flow diagram illustrating an exemplary process 300 in accordance with the present disclosure. In one embodiment, process 300 is a process for providing a battery housing 12, the battery housing 12 including a rechargeable battery cell 14 configured to provide power to the electronic device 24, the battery cell 14 initially in a deactivated, i.e., non-power supplying, mode (Block S310), detecting, by an NFC antenna 20 in the battery housing 12, a presence of the NFC tag 22 within a predetermined distance of the NFC antenna 20 (Block S320), and powering the battery cell 14 when the NFC antenna 20 has detected the presence of the NFC tag 22 within predetermined distance of the NFC antenna 20 (Block S330). In some embodiments, the predetermined distance is established such that battery pack 10 must be properly inserted into battery compartment 16 in electronic device 24.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special-purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A battery pack configured to be housed in an electronic device, the electronic device including a near field communication (NFC) tag, the battery back comprising:
a battery housing, the battery housing comprising:
a rechargeable battery cell configured to provide power to the electronic device, the rechargeable battery cell initially in a first power mode;
a storage element configured to store at least one access code;
an NFC antenna configured to:
detect a presence of the NFC tag within the electronic device;
receive information from the NFC tag, the information including at least one other access code; and
processing circuitry including a memory and a processor, the memory in communication with the processor, the memory having instructions that, when executed by the processor, configure the processor to:
convert the rechargeable battery cell from the first power mode to a second power mode when the NFC antenna has detected the presence of the NFC tag within the electronic device;
compare the received at least one other access code with the stored at least one access code; and
if the received at least one other access code matches the stored at least one access code, provide instructions to the rechargeable battery cell.

2. The battery pack of claim 1, wherein the first power mode is when the rechargeable battery cell is in a low power mode and the second power mode is when the rechargeable battery cell is in a high power mode.

3. The battery pack of claim 1, wherein the first power mode is when the rechargeable battery cell is deactivated and the second power mode is when the rechargeable battery cell is at least partially powered.

4. The battery pack of claim 1, further comprising a wireless charging coil for receiving wireless charging signals from a battery cell charging source.

5. The battery pack of claim 1, wherein the NFC antenna is configured to receive wireless charging signals from a battery cell charging source.

6. The battery pack of claim 1, wherein the NFC antenna is positioned within the battery housing within a predetermined distance from the NFC tag when the battery pack is inserted within the electronic device, the rechargeable battery cell changing from the first power mode to the second power mode when the NFC antenna is positioned within the predetermined distance from the NFC tag, and the rechargeable battery cell being in the second power mode when the NFC antenna is not positioned within the predetermined distance from the NFC tag.

7. The battery pack of claim 1, wherein the instructions include an instruction to provide a more level charge to the rechargeable battery cell.

8. The battery pack of claim 1, wherein the instructions include an instruction to provide a number of charge cycles for the rechargeable battery cell.

9. The battery pack of claim 1, wherein the instructions include an instruction to provide power to the rechargeable battery cell.

10. The battery pack of claim 1, wherein the processor is further configured to at least one of:
monitor a condition of the rechargeable battery cell, provide fuel-gauging data, implement a stress test on the rechargeable battery cell, and provide battery cell cycle count data.

11. A method for safely powering up an electronic device, the electronic device including a near field communication (NFC) tag, the method comprising:
providing a battery housing, the battery housing including a rechargeable battery cell configured to provide power to the electronic device, the battery cell initially in a non-power mode;
storing at least one access code;
detecting, by an NFC antenna in the battery housing, a presence of the NFC tag within a predetermined distance of the NFC antenna;
receiving information from the NFC tag, the information including at least one other access code;
powering the rechargeable battery cell when the NFC antenna has detected the presence of the NFC tag within predetermined distance of the NFC antenna;
comparing the received at least one other access code with the stored at least one access code; and
if the received at least one other access code matches the stored at least one access code, providing instructions to the rechargeable battery cell.

12. The method of claim 11, further comprising receiving wireless charging signals from a battery charging source.

13. The method of claim 11, further comprising positioning the NFC antenna within a predetermined distance from the NFC tag when the battery pack is inserted within the electronic device, the rechargeable battery cell changing from the non-power mode to the power mode when the NFC antenna is positioned within the predetermined distance from the NFC tag.

14. The method of claim 11, wherein the instructions include an instruction to provide a more level charge to the rechargeable battery cell.

15. The method of claim 11, wherein the instructions include an instruction to provide a number of charge cycles for the rechargeable battery cell.

16. The method of claim 11, wherein the instructions include an instruction to provide power to the rechargeable battery cell.

17. The method of claim 11, further comprising powering down the rechargeable battery cell by removing the battery housing from the electronic device.

18. A battery pack configured to be housed in an electronic device, the electronic device including a radio frequency identification (RFID) tag, the battery back comprising:
a battery housing, the battery housing comprising:
a rechargeable battery cell configured to provide power to the electronic device, the rechargeable battery cell initially in a first power mode;
a storage element configured to store at least one access code;
an RFID antenna configured to:
detect a presence of the RFID tag within the electronic device;
receive information from the RFID tag, the information including at least one other access code; and
processing circuitry including a memory and a processor, the memory in communication with the processor, the memory having instructions that, when executed by the processor, configure the processor to:
convert the rechargeable battery cell from the first power mode to a second power mode when the RFID antenna has detected the presence of the RFID tag within the electronic device;
compare the received the at least one other access code with the stored at least one access code; and
if the received at least one other access code matches the stored at least one access code, provide instructions to the rechargeable battery cell.

\* \* \* \* \*